(12) United States Patent
Nanjaiah

(10) Patent No.: US 9,179,282 B2
(45) Date of Patent: Nov. 3, 2015

(54) METHOD OF RECEPTION OF SECONDARY NOTIFICATION AFTER ETWS MESSAGE IS RECEIVED BY USER EQUIPMENT IN CONNECTED MODE

(71) Applicant: Samsung Electronics Co. Ltd., Suwon-si, Gyeonggi-do (KR)

(72) Inventor: Shivaprasad Masanapura Nanjaiah, Banglore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 13/958,894

(22) Filed: Aug. 5, 2013

(65) Prior Publication Data

US 2014/0045447 A1 Feb. 13, 2014

(30) Foreign Application Priority Data

Aug. 10, 2012 (IN) .......................... 3306/CHE/2012

(51) Int. Cl.
*H04W 4/22* (2009.01)
*H04L 12/18* (2006.01)
*H04W 52/02* (2009.01)
*H04W 76/00* (2009.01)
*H04W 4/00* (2009.01)
*H04W 4/12* (2009.01)
*H04W 76/06* (2009.01)

(52) U.S. Cl.
CPC .............. *H04W 4/22* (2013.01); *H04L 12/1845* (2013.01); *H04L 12/1895* (2013.01); *H04W 52/0216* (2013.01); *H04W 76/007* (2013.01); *H04L 12/189* (2013.01); *H04W 4/001* (2013.01); *H04W 4/12* (2013.01); *H04W 76/06* (2013.01)

(58) Field of Classification Search
CPC ......... H04W 4/22; H04H 20/59; H04H 20/71
USPC ............................................... 455/3.01, 404.1
See application file for complete search history.

(56) References Cited

U.S. PATENT DOCUMENTS

2003/0224794 A1* 12/2003 Kim et al. ..................... 455/445
2011/0136465 A1   6/2011 Ekemark et al.
2012/0020393 A1*  1/2012 Patil et al. .................. 455/67.11
2013/0331054 A1* 12/2013 Kodali ........................ 455/404.1
2014/0357183 A1* 12/2014 Rathonyi et al. ............. 455/3.01

FOREIGN PATENT DOCUMENTS

EP    2 360 981 A2    8/2011
WO    2011/086070 A1  7/2011

* cited by examiner

*Primary Examiner* — Lester Kincaid
*Assistant Examiner* — Daniel G Bassett
(74) *Attorney, Agent, or Firm* — Jefferson IP Law, LLP

(57) ABSTRACT

A method and system to receive the secondary notification messages when an ETWS primary notification message is received in connected mode of UE are provided. The method includes the way to receive the secondary notification information in UE. The secondary notification information comprises necessary associated information of the ETWS like government aid, help centers, health centers, and refugee camps and so on to help the user in many ways to combat the situation. The method discloses different ways of transition to idle mode to receive the secondary notification message according to configuration defined by the user within the UE.

18 Claims, 5 Drawing Sheets

METHOD OF RECEPTION OF SECONDARY NOTIFICATION AFTER ETWS MESSAGE IS RECEIVED BY USER EQUIPMENT IN CONNECTED MODE

CROSS-REFERENCE TO RELATED APPLICATION(S)

This application claims the benefit under 35 U.S.C. §119(a) of an Indian patent application filed on Aug. 10, 2012 in the Indian Intellectual Property Office and assigned Serial No. 3306/CHE/2012, the entire disclosure of which is hereby incorporated by reference.

TECHNICAL FIELD

The present disclosure relates to the field of Universal Mobile Telecommunications System (UMTS). More particularly, the present disclosure relates to receiving a secondary notification by a User Equipment (UE) when an Earthquake and Tsunami Warning System (ETWS) message is delivered in connected mode to the UE.

BACKGROUND

With advances in technology, mobile devices are playing a key role in our day to day life. The affordability of mobile devices in conjunction with the advances in technology has enabled most people to own a smart phone. Moreover, the introduction of user friendly operating systems into the consumer handset market enables most people to use a smart phone more efficiently than ever before. As a result, such devices have been used all over the world.

Although smart phones now have many applications in various fields such as multimedia, entertainment, gaming and so on. The main use of these devices is still to achieve communication, either using voice or data. In today's world, most smart phone users possess an email account, and would want to access these services on their handheld devices.

Today, there is work ongoing to provide different types of public warning systems. For example, support for an ETWS, enabling transmission of warning notifications about coming earthquakes and/or tsunamis to a UE through the network is ongoing. The ETWS warning notifications may be divided into a primary notification and a secondary notification. The primary notification is sent in order to notify users about the most urgent event in seconds rather than minutes, such as imminent occurrence of an earthquake and the like. There are requirements to reach the users with an ETWS primary notification message within 4 seconds. In order to avoid fake messages, inclusion of authentication or security check information is also provided in the primary notification. The secondary notification is sent to give users supplementary information that is of lesser urgency, such as instructions on what to do, where to get help, a map to refuge facilities, a time table of food distribution, and the like.

ETWS primary notification information can be delivered to the UE in all its states through messages defined in UMTS, Global System for Mobile communications (GSM), and Long Term Evolution (LTE). However, when the UE is in connected mode (either Dedicated CHannel (i.e., DCH) or Forward Access CHannel (i.e., FACH) states) because of either Circuit Switching (CS) or Packet Switching (PS), 3rd Generation Partnership Project (3GPP) specifications in UMTS do not explain how to receive the secondary notification through Cell Broadcasting Service (CBS) messages in these states. CBS messages (secondary notification messages) are received only in idle mode or cell Paging CHannel (CELL_PCH) or Universal Terrestrial Radio Access Network (UTRAN) Registration Area Paging CHannel (URA_PCH) states of a UE. In an existing system, it is left to the implementation of the UE on how to go to idle mode or CELL_PCH or URA_PCH states to receive the secondary notification when the UE receives the ETWS Message in either DCH or FACH states. Further, it is also left to the network implementation whether to release all the calls of the UEs, if they are connected and move them to idle mode/CELL_PCH/URA_PCH states or not.

Due to above mentioned reasons, it is evident that the existing system lacks a method that is used by the UE to go to idle mode or CELL_PCH or URA_PCH state to receive secondary notification CBS messages when ETWS messages are received either in DCH or in FACH states of the UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system that guides a User Equipment (UE) to take appropriate steps to enter an idle mode where it can receive a secondary notification through Cell Broadcasting Service (CBS) messages when the UE receives an Earthquake and Tsunami Warning System (ETWS) message while it is in connected mode (i.e., Dedicated CHannel (DCH) or Forward Access CHannel (FACH) states).

Another aspect of the present disclosure is to provide a method for a UE to switch to an idle mode to receive a secondary notification message when it is in either a DCH state or a FACH state.

In accordance with an aspect of the present disclosure, a method for enabling state transition to idle mode for reception of secondary notifications of an Earthquake and Tsunami Warning System (ETWS) message when a communication device receives an ETWS primary notification, when the device is in connected mode, is provided. The method includes sending a Signaling Connection Release Indication (SCRI) message to a network with a cause which indicates request to release RRC connection to move to IDLE mode, receiving a Radio Resource Control (RRC) connection release message from the network, and switching to idle mode from the connected mode for receiving the secondary notification from the network.

In accordance with another aspect of the present disclosure, a communication device for receiving secondary notification of an ETWS message, when the device is in connected mode, is provided. The communication device includes an integrated circuit having at least one processor, at least one memory having a computer program code within the integrated circuit, the at least one memory and the computer program code configured to, with the at least one processor, cause the device to send an SCRI message to a network with a cause, receive an RRC connection release message from the network, and switch to idle mode from the connected mode for receiving the secondary notification from the network.

Other aspects, advantages, and salient features of the disclosure will become apparent to those skilled in the art from the following description, which, taken in conjunction with annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
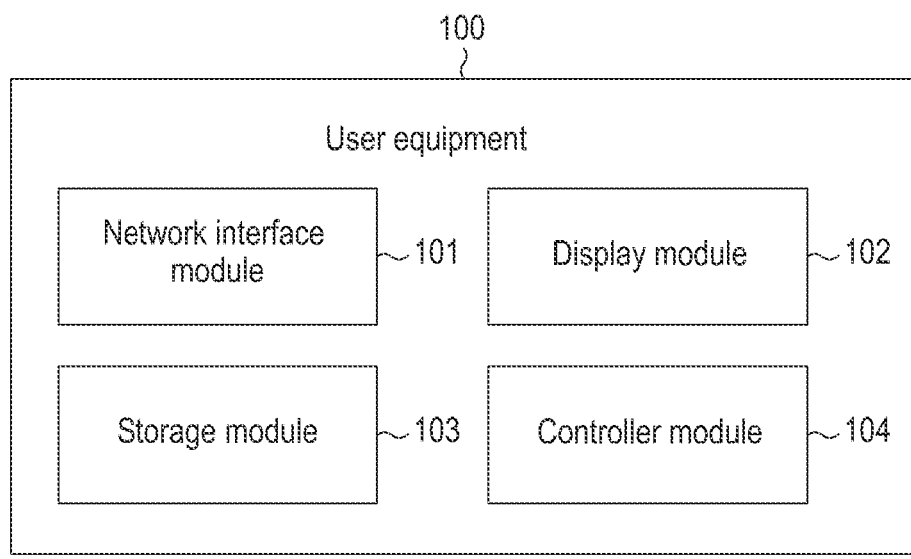
FIG. 1 illustrates a general block diagram of a User Equipment (UE) according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein achieve a method and a system that guide a User Equipment (UE) to take appropriate steps to enter an idle mode where it can receive the secondary notification through Cell Broadcasting Service (CBS) messages. The method is provided in case of a scenario when the UE receives an Earthquake and Tsunami Warning System (ETWS) message when it is in connected mode.

There exist different methods that can be used to go to an idle mode to receive secondary notification through CBS messages when ETWS primary notification messages are received in Dedicated CHannel (DCH) or Forward Access CHannel (FACH) states in the UE.

If the UE is in DCH or FACH state due to a Circuit Switching (CS) call, a Packet Switching (PS) call or CS or PS signaling, and if an ETWS primary notification message is received, since the ETWS related secondary notification is also very important, a user can decide to release the current connection and go to idle mode or cell Paging CHannel (CELL_PCH) or Universal Terrestrial Radio Access Network (UTRAN) Registration Area Paging CHannel (URA_PCH) states to receive the secondary notification messages. Further, the same can be done automatically without user intervention, if it is already configured by the user in the UE or an option of a pop-up indication message shall be given to seek user permission to go to an idle or CELL_PCH or URA_PCH state. In both cases, the method sends a Signaling Connection Release Indication (SCRI) message with a cause set as "Release connection to receive CBS". In this way, when the network receives the SCRI Message with the cause set as "Release connection to receive CBS", it can understand the purpose of the request from the UE and take appropriate actions to move the UE to either idle mode or URA_PCH or CELL_PCH state. In an embodiment, the network can also move the UE to CELL_PCH or URA_PCH state for the request sent by the UE in which case the UE can receive the secondary notifications. Once the UE receives the "Radio Resource Control (RRC) Connection Release" message from the network, it shall follow the release procedure as mentioned in the 3rd Generation Partnership Project (3GPP) specification 25.331 before entering to idle Mode.

Referring now to the drawings, and more particularly to FIGS. 1 through 5, where similar reference characters denote corresponding features consistently throughout the figures, there are shown various embodiments.

FIG. 1 illustrates a general block diagram of a UE according to various embodiments of the present disclosure.

Referring to FIG. 1, the UE 100 comprises a network interface module 101, a display module 102, a storage module 103 and a controller module 104. The network interface module 101 helps the user to select a particular network within a geographical area. The display module 102 provides a user interface with which the user can input a selection to the UE. The storage module 103 comprises a memory which can be an internal memory or external memory. If implemented as an external memory, the storage module 103 can be a memory card connected to the UE 100. The controller module 104 controls all the functions and operations within the UE 100.

Throughout the description the term UE and communication device is used interchangeably.

In an embodiment, the UE 100 can be a mobile device, a tablet, a Personal Digital Assistants (PDA), and so on.

Figure 2:
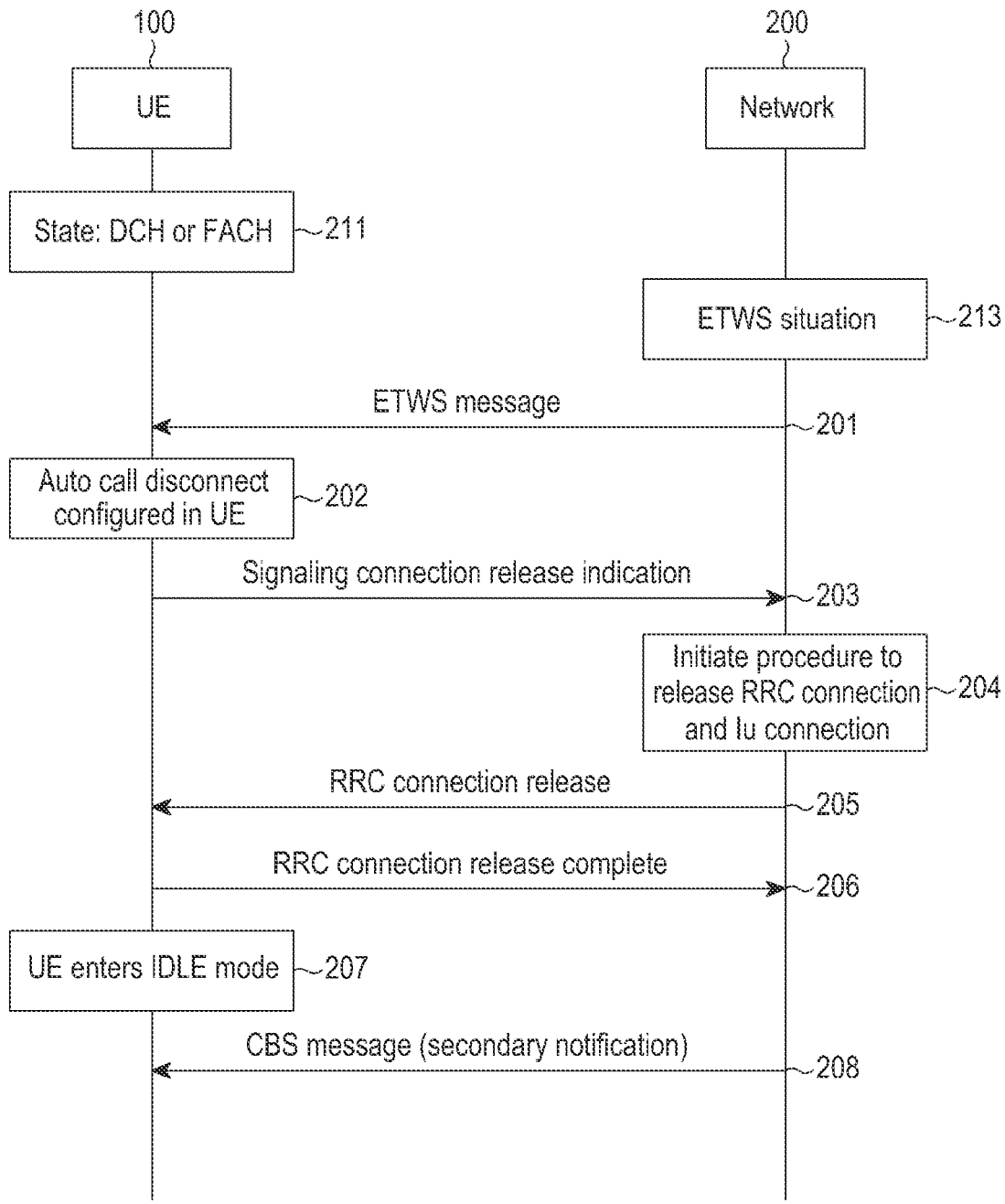
FIG. 2 illustrates a sequence diagram between a UE and a network when auto disconnect of a call is configured in the UE according to various embodiments of the present disclosure.

FIG. 2 illustrates a sequence diagram between a UE and a network when auto disconnect of a call is configured in the UE according to various embodiments of the present disclosure.

Referring to FIG. 2, the UE 100 is in the connected state at operation 211, which can be either DCH or FACH. When an earthquake or tsunami situation occurs at operation 213, the network 200 to which the UE 100 is connected sends an ETWS message to the UE 100 at operation 201.

In an embodiment, ETWS messages are primary notification messages which are sent by the network 200 as a warning or alert message whenever an earthquake, a tsunami or any other natural disaster happens in an area.

ETWS primary notification messages mainly carry the information related to a disaster in a very short message. In an embodiment, the ETWS messages are sent to the UE 100 based on the regulations from the government.

The UE 100 determines whether an auto disconnect of a call is configured by the user at operation 202. If the UE 100 determines at operation 202 that the auto disconnect of call is configured by the user, then the UE 100 sends an SCRI to the network 200 at operation 203. This SCRI includes an indication that informs the network 200 to release the connection to receive secondary notification through CBS messages.

Upon receiving the SCRI from the UE 100, the network 200 initiates a procedure to release RRC connection and/or Iu connection at operation 204.

The network 200 informs the UE 100 about RRC connection release at operation 205. Then, the UE 100 sends the RRC connection release complete message to network 200 at operation 206.

At operation 207, the UE enters an idle mode after releasing the connection and receives the secondary notification through CBS messages from the network 200 at operation 208.

In an embodiment, the secondary notification messages are generally CBS messages which are broadcasted in a cell of an affected area. Generally, after ETWS primary notification messages have been sent, the network sends secondary notification messages through CBS messages.

Figure 3:
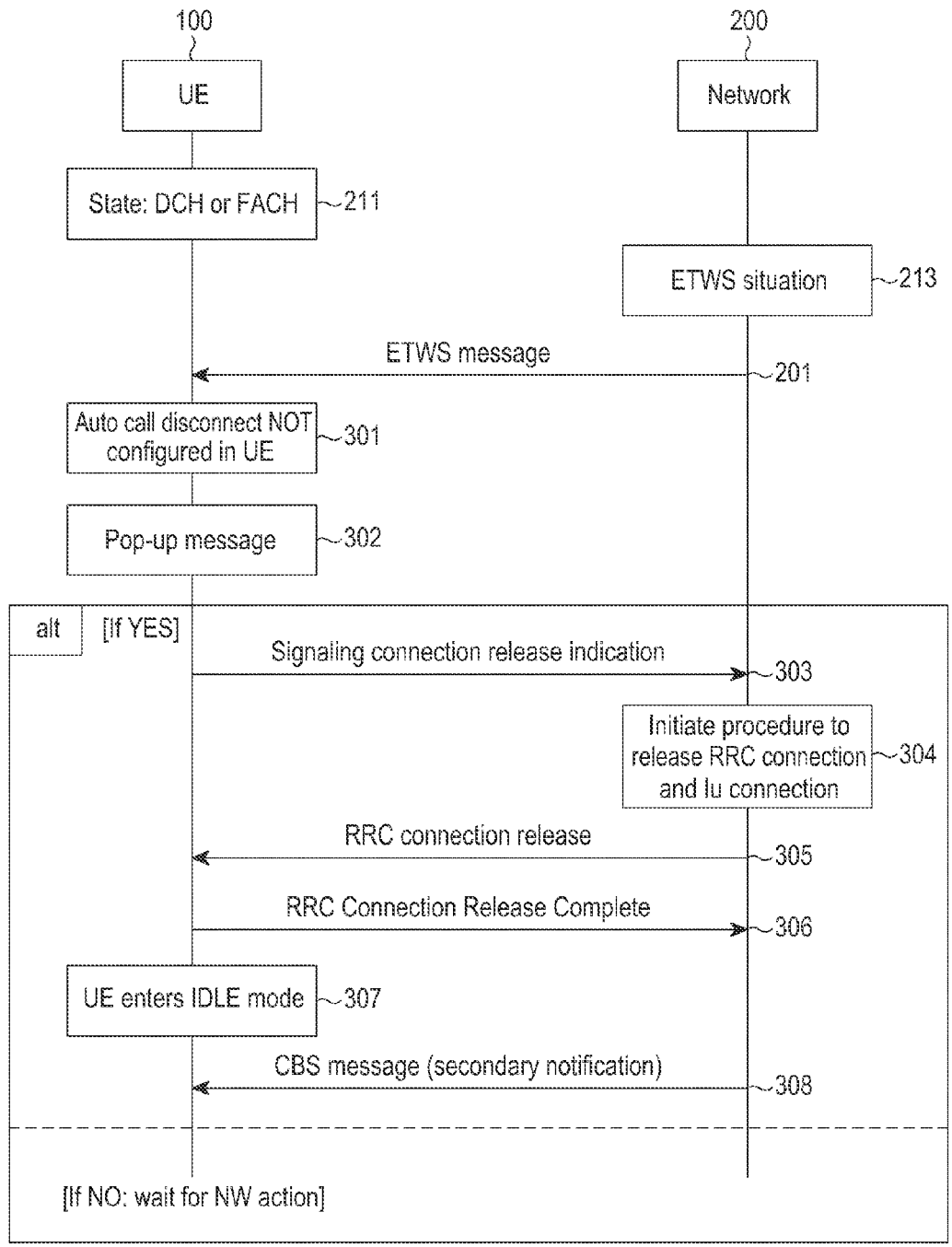
FIG. 3 illustrates a sequence diagram between a UE and a network when auto disconnect of a call is not configured in the UE according to various embodiments of the present disclosure.

FIG. 3 illustrates a sequence diagram between a UE and a network when auto disconnect of a call is not configured in the UE according to various embodiments of the present disclosure.

Referring to FIG. 3, the UE 100 is in the connected mode at operation 211, which can be either DCH or FACH. When an earthquake or tsunami situation occurs at operation 213, the network 200 to which the UE 100 is connected sends an ETWS message to the UE 100 at operation 201.

The UE determines whether auto disconnect of a call is configured by the user at operation 301. If the UE 100 determines at operation 301 that auto call disconnect is not configured by the user, then the UE 100 triggers a pop-up indication message to the user for obtaining a confirmation from the user for releasing the connection at operation 302.

If the user provides confirmation to the UE 100 through the pop-up indication at operation 302 for releasing the connection, then the UE 100 sends an SCRI at operation 303. This SCRI may include an indication of "Release connection to receive CBS" that informs the network 200 to release the connection to receive secondary notification through CBS messages.

Upon receiving the SCRI message from the UE 100, the network 200 initiates a procedure to release the RRC connection and/or Iu connection at operation 304. The network 200 sends an RRC connection release message to the UE 100 at operation 305. Then, the UE 100 sends the RRC connection release complete message to network 200 at operation 306. Further, the UE 100 enters an idle mode at operation 307 and receives the secondary notification through CBS messages from the network 200 at operation 308.

Alternatively, if the user of the UE 100 is not interested in receiving secondary notification message from the network or if the user is not providing a confirmation to the pop-up indication message generated by the UE 100 at operation 302, then the UE 100 waits for the network action.

If the UE 100 does not support sending "Release connection to receive CBS" cause in the SCRI message, it can choose to send the SCRI message with the cause set as "any other cause."

ASN1 changes proposed to 3GPP UMTS, RRC spec 25.331:

10.3.3.37a Signaling Connection Release Indication Cause

This information element is used to indicate to the UTRAN that there is no more PS data for a prolonged period.

TABLE 1

| Information Element/ Group name | Need | Multi | Type and Reference | Semantics description | Version |
|---|---|---|---|---|---|
| Signaling Connection Release Indication Cause | MP | | Enumerated (UE Requested PS Data session end, any other cause, Release connection to receive CBS) | | |

Figure 4:
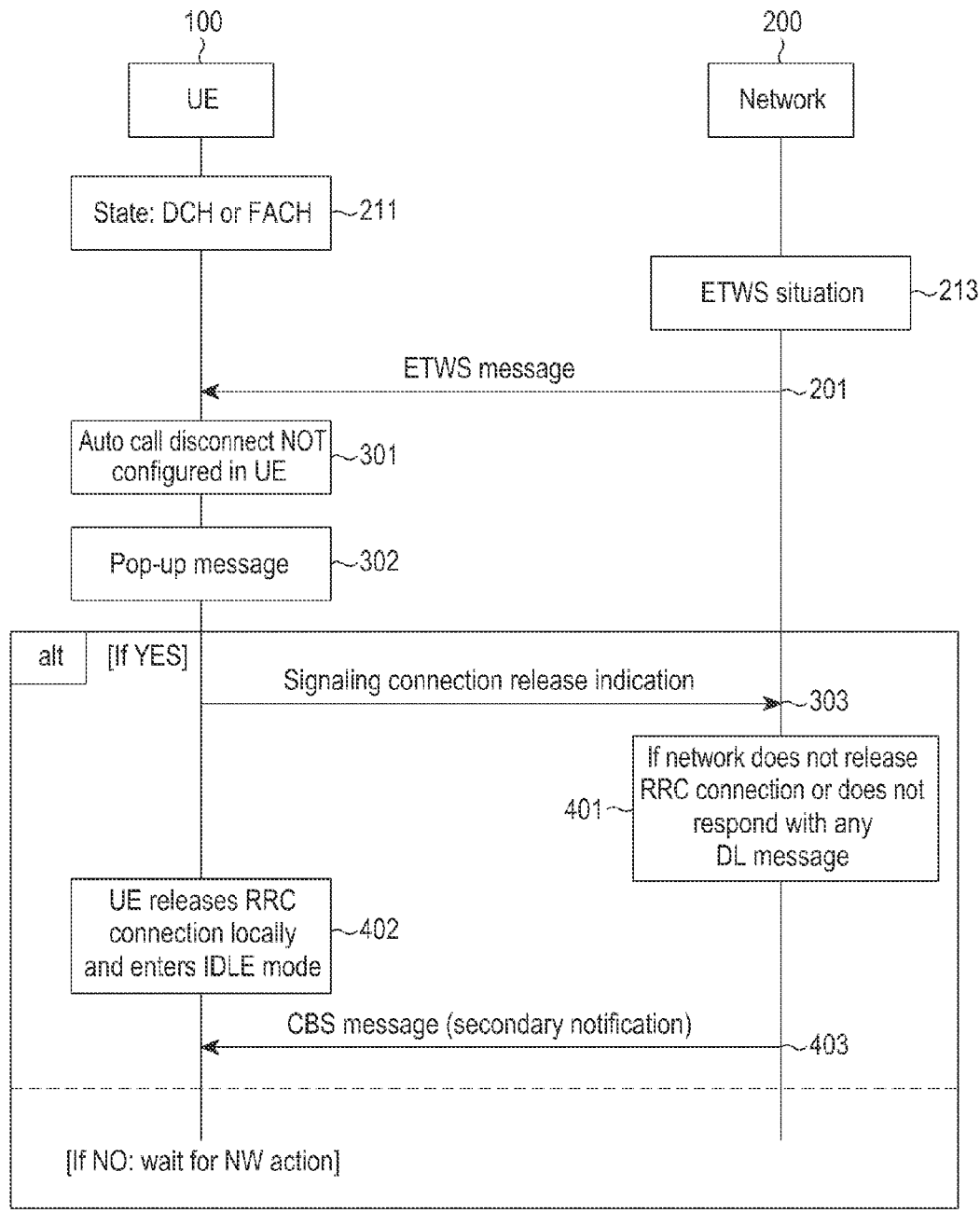
FIG. 4 illustrates a sequence diagram between a UE and a network when a forceful Radio Resource Control (RRC) connection release is done locally in the UE when a network fails to or otherwise does not respond according to various embodiments of the present disclosure.

FIG. 4 illustrates a sequence diagram between a UE and a network when a forceful RRC connection release is done locally in the UE when a network fails to respond or does not respond according to various embodiments of the present disclosure.

Referring to FIG. 4, the UE 100 is in connected mode at operation 211, which can be either DCH or FACH. When an earthquake or tsunami situation occurs at operation 213, the network 200 to which the user is connected sends an ETWS message to the UE 100 at operation 201.

The UE 100 determines whether auto disconnect of a call is configured by the user at operation 301. If the UE 100 determines at operation 301 that auto disconnect of a call is not configured by the user, then the UE 100 triggers a pop-up indication message to the user for obtaining a confirmation from the user for releasing the connection at operation 302.

If the user provides confirmation to the UE 100 through the pop-up indication message at operation 302 for releasing the connection, then the UE 100 sends an SCRI at operation 303. This SCRI may indicate any other cause for disconnecting the call (either "any other cause" or "Release connection to receive CBS").

After sending the SCRI, if the UE 100 does not receive any downlink message from the network 200 to move the UE 100 to either idle or CELL_PCH or URA_PCH state at operation 401, the UE 100 may release the RRC Connection locally either immediately or after a certain time at the UE 100 at operation 402.

In case the network 200 sends (not shown) any downlink message to move the UE 100 to idle, CELL_PCH or URA_PCH, then the UE 100 shall follow the corresponding downlink message procedure and enter (not shown) either idle mode, CELL_PCH or URA_PCH state.

The UE receives secondary notification through CBS messages from the network 200 after moving to idle mode or CELL_PCH or URA_PCH states at operation 403.

Alternatively, if the user of the UE 100 is not interested in receiving a secondary notification message from the network 200 or if the user does not provide a confirmation to the pop-up indication message generated by the UE 100 at operation 302, then the UE 100 waits for the network action.

The method for receiving the secondary notification message after receiving the ETWS message from the network is explained with an example as described herein.

The user configures the mobile device to receive the secondary notification message automatically or with manual instructions by changing the settings within the menu of the mobile device. Further, there may exist ETWS message settings within the menu of the mobile device which the user can activate. Now, the network to which the mobile device is connected sends the ETWS message upon some occurrence of a disaster such as an earthquake, a tsunami and the like.

When the mobile device is not configured to receive a secondary notification message from the network automatically, then the user receives a pop-up indication in the mobile device to inform the user that the current ongoing CS or PS call is to be disconnected to receive the secondary notification from network.

If the user is interested in receiving the secondary notification message, then the user provides a confirmation to the pop-up indication message for releasing the connection and receiving the secondary notification. Upon receiving the CS or PS call release confirmation from the user, the mobile device receives the secondary notification including information such as refugee camps, government aid, help centers and the like after entering the idle mode.

Figure 5:
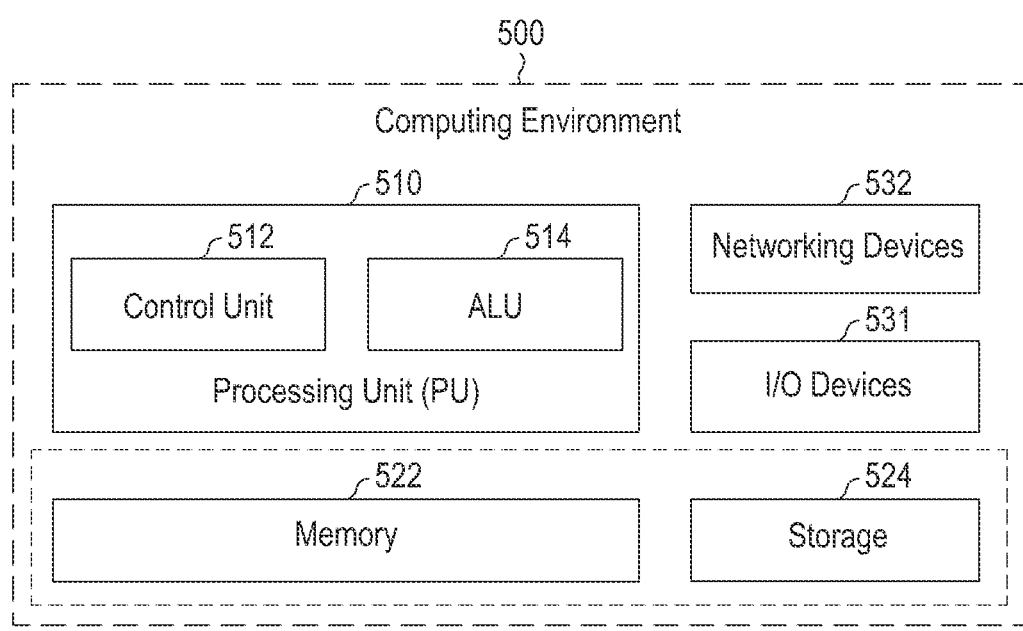
FIG. 5 illustrates a computing environment implementing the application according to various embodiments of the present disclosure.

FIG. 5 illustrates a computing environment for implementing the application according to various embodiments of the present disclosure.

Referring to FIG. 5, the computing environment 500 comprises at least one processing unit 510 that is equipped with a control unit 512 and an Arithmetic Logic Unit (ALU) 514, a memory 522, a storage unit 524, a plurality of networking devices 532, and a plurality of Input/Output (I/O) devices 531.

The processing unit 510 is responsible for processing the instructions of the algorithm. The processing unit 510 receives commands from the control unit 512 in order to perform its processing. Further, any logical and arithmetic operations involved in the execution of the instructions are computed with the help of the ALU 514.

The overall computing environment can be composed of multiple homogeneous and/or heterogeneous cores, multiple CPUs of different kinds, special media and other accelerators. Further, the process unit 510 may be located on a single chip or over multiple chips.

The algorithm comprising instructions and codes required for the implementation are stored in either the memory 522 or the storage 524 or both. At the time of execution, the instructions may be fetched from the corresponding memory 522 and/or storage 524, and executed by the processing unit 510.

In case of any hardware implementations, various networking devices 532 or external I/O devices 531 may be connected to the computing environment 500 to support the implementation through the networking unit 532 and the I/O device unit 531.

The various embodiments disclosed herein can be implemented through at least one software program running on at least one hardware device and performing network management functions to control the elements. The elements shown in FIGS. 1 through 5 may include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for enabling reception of secondary notification of an Earthquake and Tsunami Warning System (ETWS) message when a communication device is in connected mode, the method comprising:
   determining whether the communication device supports a "Release connection to receive CBS" message;
   sending a Signaling Connection Release Indication (SCRI) message with a cause to a network;
   receiving a Radio Resource Control (RRC) connection release message from the network;
   sending an RRC connection release complete message to the network; and
   switching to idle mode from the connected mode for receiving the secondary notification from the network,
   wherein the cause comprises the "Release connection to receive CBS" message to indicate to the network to move the communication device to the idle mode when the "Release connection to receive CBS" message is supported and an "other cause" message to indicate to the network to move the communication device to the idle mode when the "Release connection to receive CBS" message is not supported.

2. The method as in claim 1, wherein the connected mode of the communication device comprises at least one of a Dedicated CHannel (DCH) state or a Forward Access CHannel (FACH) state.

3. The method as in claim 1, further comprising:
   receiving the secondary notification of the ETWS message when the communication device is configured to trigger the release of the RRC connection automatically.

4. The method as in claim 3, further comprising:
   providing manual approval to release the RRC connection to receive the secondary notification of the ETWS message when the communication device is not configured to trigger the release automatically.

5. The method as in claim 4, further comprising:
   generating an indication for seeking permission to release the RRC connection in the connected mode.

6. The method as in claim 5, further comprising:
   releasing the RRC connection for receiving the secondary notification from the network.

7. The method as in claim 1, further comprising:
   releasing the RRC connection locally to move the communication device to the idle mode, if the network does not respond to the SCRI message with the cause.

8. The method as in claim 1, wherein the network releases the RRC connection and Iu after the receiving of the SCRI message with the cause from the communication device to move the communication device to idle mode for receiving the secondary notification.

9. A communication device for receiving secondary notification of an Earthquake and Tsunami Warning System (ETWS) message, when the device is in connected mode, the communication device comprising:
   an integrated circuit comprising at least one processor;
   at least one memory having a computer program code within the integrated circuit;
   the at least one memory and the computer program code configured to, with the at least one processor, cause the device to:
   determine whether the communication device supports a "Release connection to receive CBS" message;
   send a Signaling Connection Release Indication (SCRI) message with a cause to a network;
   receive a Radio Resource Control (RRC) connection release message from the network;

send an RRC connection release complete message to the network; and switch to idle mode from the connected mode for receiving the secondary notification from the network, wherein the cause comprises the "Release connection to receive CBS" message to indicate to the network to move the communication device to the idle mode when the "Release connection to receive CBS" message is supported and an "other cause" message to indicate to the network to move the communication device to the idle mode when the "Release connection to receive CBS" message is not supported.

10. The communication device as in claim 9, wherein the communication device is configured to release the RRC connection locally to move to the idle mode, if the network does not respond to the SCRI message with the cause.

11. The communication device as in claim 9, wherein the communication device is configured to generate an indication for requesting to release the RRC connection in the connected mode.

12. The communication device as in claim 11, wherein the communication device is configured to release the RRC connection to receive the secondary notification from the network.

13. The communication device as in claim 9, wherein the connected mode of the communication device comprises at least one of a Dedicated CHannel (DCH) or a Forward Access CHannel (FACH) state.

14. The communication device as in claim 9, wherein the communication device is configured to receive the secondary notification of the ETWS message when the communication device is configured to trigger the release of the RRC connection automatically.

15. The communication device as in claim 14, wherein the communication device is configured to provide manual approval to release the RRC connection to receive the secondary notification of the ETWS message when the communication device is not configured to trigger the release automatically.

16. The communication device as in claim 9, wherein the network releases the RRC connection and Iu after the receiving of the SCRI message with the cause from the communication device to move the communication device to idle mode for receiving the secondary notification.

17. A system for enabling reception of secondary notification of an Earthquake and Tsunami Warning System (ETWS) message comprising a communication device and a network when the communication device is in connected mode, the communication device is configured to:

determine whether the communication device supports a "Release connection to receive CBS" message send a Signaling Connection Release Indication (SCRI) message with a cause to a network;

receive a Radio Resource Control (RRC) connection release message from the network;

send an RRC connection release complete message to the network; and switch to idle mode from the connected mode for receiving the secondary notification from the network, wherein the cause comprises the "Release connection to receive CBS" message to indicate to the network to move the communication device to the idle mode when the "Release connection to receive CBS" message is supported and an "other cause" message to indicate to the network to move the communication device to the idle mode when the "Release connection to receive CBS" message is not supported.

18. The system of claim 17, wherein the network releases the RRC connection and Iu after the receiving of the SCRI message with the cause from the communication device to move the communication device to idle mode for receiving the secondary notification.

* * * * *